United States Patent
Tanno et al.

(10) Patent No.: US 9,022,086 B2
(45) Date of Patent: May 5, 2015

(54) PNEUMATIC TIRE

(75) Inventors: Atsushi Tanno, Hiratsuka (JP); Daisuke Kanenari, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 13/460,459

(22) Filed: Apr. 30, 2012

(65) Prior Publication Data

US 2012/0298272 A1 Nov. 29, 2012

(30) Foreign Application Priority Data

May 23, 2011 (JP) ................................ 2011-114612

(51) Int. Cl.
| | |
|---|---|
| *B60C 5/00* | (2006.01) |
| *B60C 5/14* | (2006.01) |
| *B60C 19/00* | (2006.01) |
| *B60C 23/04* | (2006.01) |
| *B60C 23/00* | (2006.01) |
| *B29D 30/00* | (2006.01) |

(52) U.S. Cl.
CPC ........ *B29D 30/0061* (2013.01); *B60C 2019/004* (2013.01); *B60C 23/0493* (2013.01); *B29D 2030/0072* (2013.01); *B29D 2030/0077* (2013.01)

(58) Field of Classification Search
CPC ........ B60C 19/00; B60C 23/00; B60C 23/04; B60C 11/243; B60C 19/002; B60C 19/003; B60C 19/122; B60C 2019/004
USPC ........... 152/152.1, 367, 368, 372, 154.1, 565; 156/152
See application file for complete search history.

(56) References Cited

U.S. PATENT DOCUMENTS

| | | |
|---|---|---|
| 7,108,761 B2 | 9/2006 | Bell |
| 7,658,809 B2 | 2/2010 | Bell |
| 7,900,666 B2 | 3/2011 | Bell |
| 2009/0089978 A1* | 4/2009 | Sugihara et al. ............... 24/90.1 |
| 2009/0173422 A1* | 7/2009 | Utsumi et al. ................. 152/510 |

FOREIGN PATENT DOCUMENTS

| | | | |
|---|---|---|---|
| GB | 190923098 A * | 0/1910 | ............ B60C 19/122 |
| JP | 2005-517581 | 6/2005 | |
| JP | 2006-044503 | 2/2006 | |
| JP | 2008230411 A * | 10/2008 | .............. B60C 19/00 |
| WO | WO 03/070496 | 8/2003 | |

OTHER PUBLICATIONS

Machine Translation: JP2008-230411; Uchiumi, Atsuro; No date.*

* cited by examiner

*Primary Examiner* — Justin Fischer
*Assistant Examiner* — Kendra Shin
(74) *Attorney, Agent, or Firm* — Thorpe North & Western, LLP (57) ABSTRACT

A pneumatic tire that is provided with a first fastener of a separatable pair of mechanical fasteners on a tire inner surface, wherein, even in cases where a desired object is engaged/fixed using only one fastener, the object does not rotate having the fastener as a central axis when the tire is in use. A first fastener of the pair of mechanical fasteners is provided on a tire inner surface, and the mechanical fasteners are provided with a rotation preventing mechanism for preventing the fasteners from mutually rotating when the pair of mechanical fasteners are engaged.

19 Claims, 7 Drawing Sheets

PNEUMATIC TIRE

PRIORITY CLAIM

Priority is claimed to Japan Patent Application Serial No. 2011-114612 filed on May 23, 2011.

BACKGROUND

1. Technical Field

The present technology relates to a pneumatic tire, and particularly to a pneumatic tire by which a useful and novel method for attaching a desired object, particularly an electronic device, to an inner surface of a pneumatic tire is realized.

2. Related Art

In recent years, various attempts at disposing objects having various functions on an inner surface of a pneumatic tire have been made.

For example, an attaching method has been proposed in which tire tags (radio frequency identification tags), chips, or the like are attached to an inner liner or the like of a green tire using a surface fastener such as a hook and loop fastener, a hook and hook fastener, or the like (Japanese Unexamined Patent Application Publication (translation of PCT application) No. 2005-517581).

Additionally, a pneumatic tire has been proposed in which a surface fastener is vulcanization bonded to a region corresponding to a tread portion of a tire inner surface, and a noise absorbing member is attached to the tire inner surface via the surface fastener (Japanese Unexamined Patent Application Publication No. 2006-44503A).

The surface fasteners proposed in Patent Documents 1 and 2 are preferable in that relatively strong engagement force is realized when attaching, and engagement on a surface can be achieved without slight misalignments when attaching becoming a problem.

However, with surface fasteners, a state in which the individual engaging elements of the surface fastener are engaged is not ideal due to the inner circumferential surface of the pneumatic tire being an annular, curved surface. With surface fasteners, portions of the edges and center portions become raised, and an amount of obtained engagement force varies (positional variation within the tire and variation from tire to tire). As a result, in some cases, the expected engagement force is not obtained. Additionally, partial physical deterioration and deterioration/declining over time of the engagement force of an entirety of the surface fastener accompanying the progression of the partial physical deterioration occurs as a result of repetitive deformation and compaction over an extended period of time caused by rotation at high speeds in a state of relatively elevated temperatures. This has led to difficulty in maintaining desired engagement force over an extended period of time.

As a result, surface fasteners could not be depended on to provide a high level of reliability for providing an object, having a special function for a certain purpose, on a tire inner surface.

In light of the foregoing, the present inventors have previously proposed a pneumatic tire having one side of a separatable pair of mechanical fasteners on a tire inner surface (Japanese Patent Application No. 2010-167839) as a pneumatic tire in which obtained engagement force is great and is essentially free of variations (positional variation within the tire and variation from tire to tire); the engagement force deteriorates/declines minimally over time due to extreme usage conditions including repetitive deformation and compaction over an extended period of time caused by tire rotation at high speeds in a state of relatively elevated temperatures; and the desired engagement force can be maintained over an extended period of time.

Here, the "mechanical fasteners" are a pair of fasteners configured so that two fasteners can be separated and can be mechanically re-engaged, and so that this engaging and separating can be freely repeated. Exemplary types of such mechanical fasteners are those known as "hooks" or "snaps". Specific examples of products in the clothing industry and the like that are generally included as mechanical fasteners are snap buttons, ring snaps, ring hooks, American snaps, American hooks, eyelet hooks, spring hooks, and jumper hooks. Such mechanical fasteners differ from surface fasteners in that while an area of the engaging part of a surface fastener is unlimited in the entire area, the area of the engaging part of a mechanical fastener is small (e.g. preferably from about 1 to 115 mm$^2$, or the like, and more preferably from about 4 to 90 mm$^2$). In other words, the mechanical fastener is a point fastener. In other words, even when engaged at a small area of from about 1 to 115 mm$^2$ or the like, due to a mechanical male-female structure or the like, strong engaging is achieved. The mechanical fasteners are made from a metal, rubber, synthetic resin material or the like. Fasteners known as "hooks" or "snaps" are known in the clothing industry and the like, but approaches using these mechanical fasteners in the tire industry have been superior from the perspectives of the degree of obtained engagement force, irregularities in size, and certainty of engaging operations.

Figure 1:
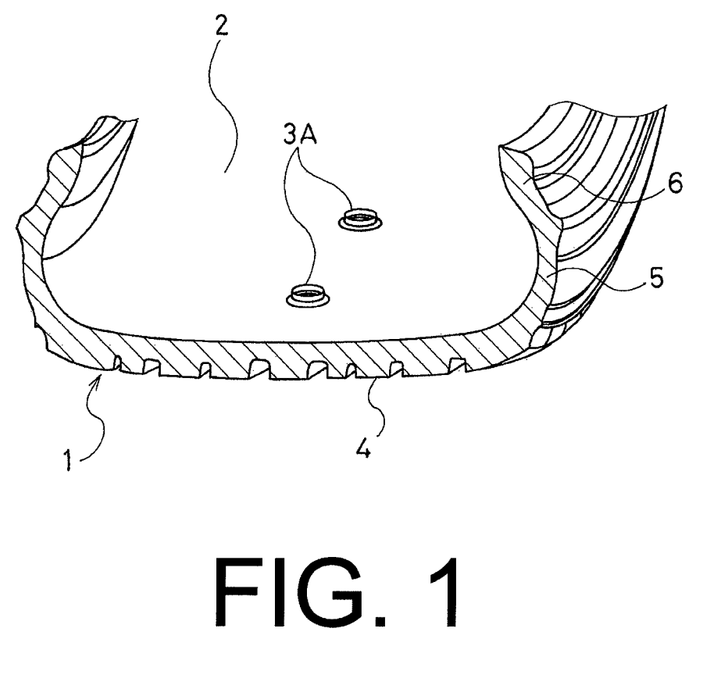
FIG. 1 is a perspective view of a partial cross section illustrating an embodiment of the pneumatic tire of the present technology.
Figure 2A:
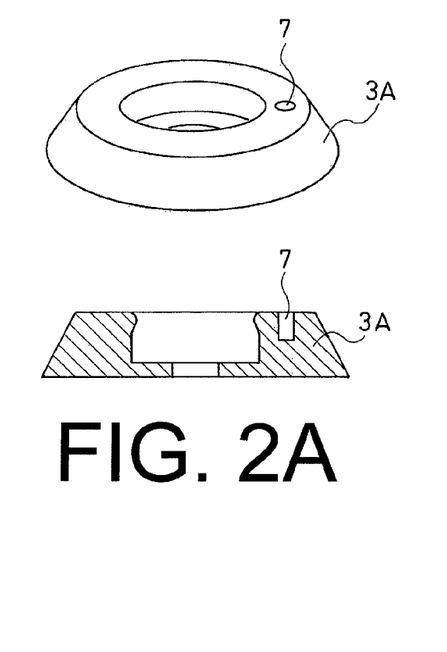
FIGS. 2A to 2C are explanatory drawings illustrating an example of a pair of mechanical fasteners used in the pneumatic tire of the present technology.
Figure 2B:
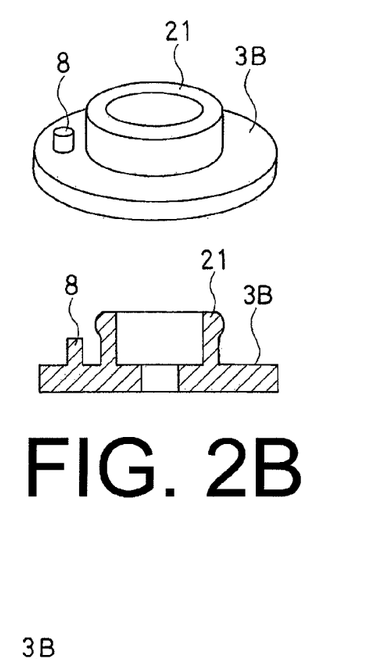
Figure 2C:
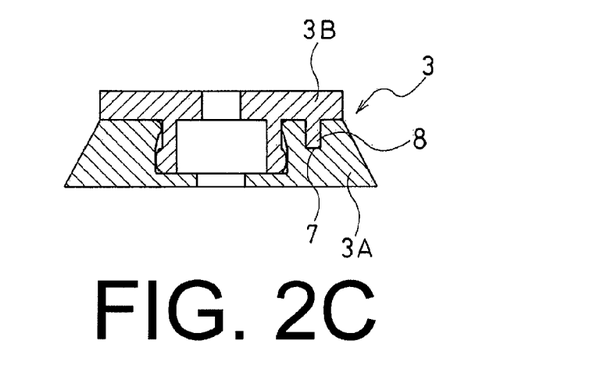
Figure 9A:
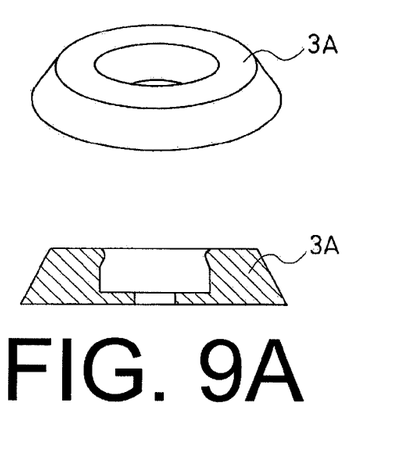
FIGS. 9A to 9C are explanatory drawings illustrating an example of a pair of mechanical fasteners not used in the present technology.
Figure 9B:
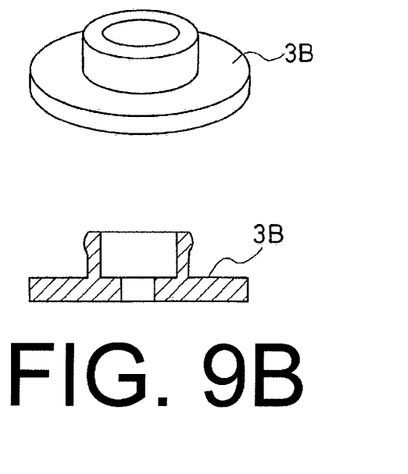
Figure 9C:
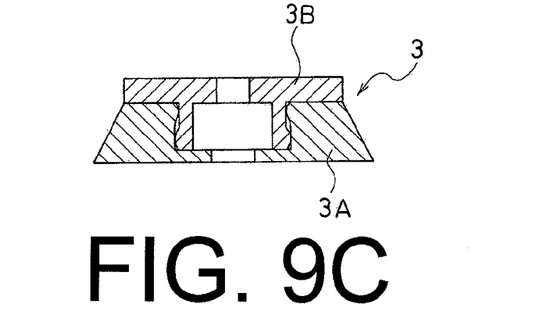

FIG. 1 illustrates a state in which a first fastener of this pair of mechanical fasteners is attached to a tire inner surface. In FIG. 1, a first fastener 3A of a separatable pair of mechanical fasteners 3 is provided on a tire inner surface 2 of a pneumatic tire 1. 4 is a tread portion, 5 is a side wall portion, and 6 is a bead portion. The mechanical fasteners 3 are constituted by a pair of fasteners including a concave or female fastener 3A as illustrated in FIG. 9A, and a convex or male fastener 3B as illustrated in FIG. 9B. FIG. 9C illustrates a state in which this pair of fasteners is engaged.

Based on a tire side structure where the first fastener (3A) of the pair of mechanical fasteners is provided on the tire inner surface, a desired object having the second fastener (3B) of the pair of mechanical fasteners is disposed on an inner surface of the pneumatic tire by engaging with the fastener on the tire inner surface side, which pairs therewith.

However, a problem occurs due to the disposal method of the object on the tire inner surface using such mechanical fasteners, particularly when attaching an object having properties by which intended performance ceases to be displayed based on an attachment orientation thereof.

For example, in cases where a relatively small sized object is attached using only one fastener, there has been a problem where this small sized object rotates, having the fastener as a central axis of rotation, when in use (during tire traveling). When the attached object is an electronic device, this problem of the object rotating results in the direction of the antenna in the electronic device changing. This leads to the problem of instantaneous variations in receiving sensitivity. Moreover, this problem of the object rotating leads to a problem of accurate measurements becoming impossible in cases where the object is an acceleration sensor.

In order to prevent rotation, instead of using only one fastener to fix the object, always engaging/fixing the object at a plurality of locations using a plurality of fasteners has also been considered. However, in cases where the object to be fixed is small in size and the like, for example, in cases where the object is the electronic device described above and the like, there is a problem in that it is structurally difficult to engage/fix the object at a plurality of locations using a plurality of fasteners.

In light of the foregoing, an object of the present technology is to provide a pneumatic tire that is provided with a first fastener of a separatable pair of mechanical fasteners on a tire inner surface, wherein, even in cases where a desired object is engaged/fixed using only one fastener, the object does not rotate having the fastener as a central axis when the tire is in use.

SUMMARY

A pneumatic tire of the present technology that achieves the aforementioned object has a configuration as shown in the following (1).

(1) A pneumatic tire including a separatable pair of mechanical fasteners wherein a first fastener of the pair of mechanical fasteners is provided on a tire inner surface, and the mechanical fasteners are provided with a rotation preventing mechanism for preventing the fasteners from mutually rotating when the pair of mechanical fasteners are engaged.

The pneumatic tire according to the present technology preferably is configured as described in any of (2) to (7) below.

(2) The pneumatic tire described in (1), wherein the rotation preventing mechanism includes a convex portion provided on the first fastener and a concave portion, which corresponds to the convex portion, provided on a second fastener of the separatable pair of mechanical fasteners.

(3) The pneumatic tire described in (1) or (2), including an indicator of an attachment orientation in the vicinity where the mechanical fasteners are disposed.

(4) The pneumatic tire described in any of (1) to (3), wherein an object provided with the second fastener that engages with the first fastener on the tire inner surface is fixed on the tire inner surface by engaging the first fastener with the second fastener.

(5) The pneumatic tire described in (4), wherein the object provided with the second fastener has an indicator or shape indicating the attachment orientation.

(6) The pneumatic tire described in (4) or (5), wherein the object provided with the second fastener is an electronic circuit.

(7) The pneumatic tire described in (6), wherein the sensor is an acceleration sensor or an angular velocity sensor.

A pneumatic tire is provided that has a first fastener of a separatable pair of mechanical fasteners on a tire inner surface, wherein, even in cases where a desired object is engaged/fixed using only one fastener, the object does not rotate having the fastener as a central axis when the tire is in use. Thus, function/performance of the desired object having special function/performance that is attached to the tire inner surface can be sufficiently displayed.

A pneumatic tire is provided that displays higher, more reliable effects than the effects of the technology according to claim 1.

A pneumatic tire is provided wherein it is possible to attach an object, which can display high functionality when attached having a specific attachment orientation, in an optimal state with regards to the attachment orientation; and wherein function/performance obtained by attaching the desired object having special function/performance on the tire inner surface can be sufficiently displayed.

A pneumatic tire having the same effects realized with the technology.

A pneumatic tire is provided wherein it is possible to attach an object, which can display high functionality when attached having a specific attachment orientation, in an optimal state with regards to the attachment orientation; and wherein function/performance obtained by attaching the desired object having special function/performance on the tire inner surface can be sufficiently displayed.

A pneumatic tire is provided in which an object having a desired function is attached to a tire inner surface, the object being held so as not to rotate or the like when the tire is traveling; and in which great engagement force and superior durability are realized.

BRIEF DESCRIPTION OF THE DRAWINGS

FIGS. 2A and 2B illustrate fasteners that, together, form a pair; and FIG. 2C illustrates a state in which these fasteners are engaged. In FIGS. 2A and 2B, the top parts of the drawings are appearance perspective views, seen looking down at an angle, and the bottom parts of the drawings are cross-sectional views, seen from a straight-on direction.

FIGS. 9A and 9B illustrate fasteners that, together, form a pair; and FIG. 9C illustrates a state in which these fasteners are engaged. In FIGS. 9A and 9B, the top parts of the drawings are appearance perspective views, seen looking down at an angle, and the bottom parts of the drawings are cross-sectional views, seen from a straight-on direction.

DETAILED DESCRIPTION

A detailed explanation of the pneumatic tire of the present technology will be given below.

A pneumatic tire of the present technology includes a separatable pair of mechanical fasteners wherein a first fastener of the pair of mechanical fasteners is provided on a tire inner surface, and the mechanical fasteners 3 (3A and 3B) are provided with a rotation preventing mechanism for preventing the fasteners from mutually rotating when the pair of mechanical fasteners are engaged.

In FIG. 1, a concave portion 7 is provided on a concave or female fastener 3A and a convex portion 8 is provided on a convex or male fastener 3B as the rotation preventing mechanism according to the present technology. When engaging the fasteners 3A and 3B, these fasteners cannot be engaged without mating the concave portion 7 and the convex portion 8; and when the concave portion 7 and the convex portion 8 are mated, the fasteners 3A and 3B cannot rotate relative to each other.

As a result of the configuration described above, even when fixing an object via the engagement of only one mechanical fastener, at the least, unintentional movement of the object, which is provided with the fastener 3B and is fixed via the fastener 3B (not illustrated in FIG. 1; shown as 13 in FIGS. 5A and 5B, 6B, and 7), caused by relative rotation of the fasteners 3A and 3B will not occur. This results in the preservation of the function of the object being ensured, and the preservation of the durability of the object being excellent.

In cases where the concave portion 7 and the convex portion 8 are not specifically provided, a cross-sectional shape of an engaging cylinder 21 of the convex or male fastener 3B may be provided with a non-circular cross-sectional shape such as an elliptical or polygonal shape as another example of a rotation preventing mechanism. This is because, if the shape is the non-circular cross-sectional shape, both the fasteners 3A and 3B will not be able to rotate relative to each other. Additionally, the concave portion 7 and the convex portion 8 may be provided elsewhere than on the main bodies of the fasteners 3A and 3B, and may be provided on base portions of the concave portion 7 and the convex portion 8.

Figure 3A:
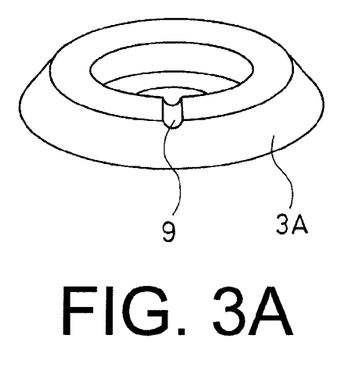
FIGS. 3A and 3B are explanatory drawings illustrating another example of mechanical fasteners which, together, form a pair, and are used in the pneumatic tire of the present technology.
Figure 3B:
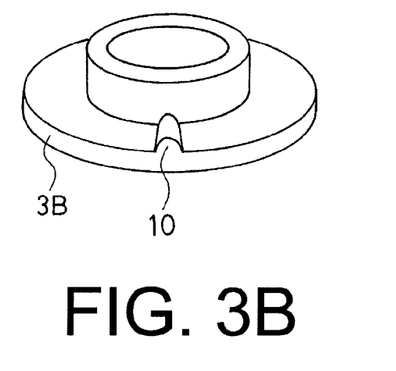
Figure 4A:
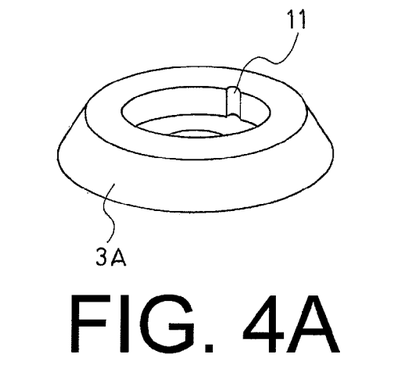
FIGS. 4A and 4B are explanatory drawings illustrating another example of mechanical fasteners which, together, form a pair, and are used in the pneumatic tire of the present technology.
Figure 4B:
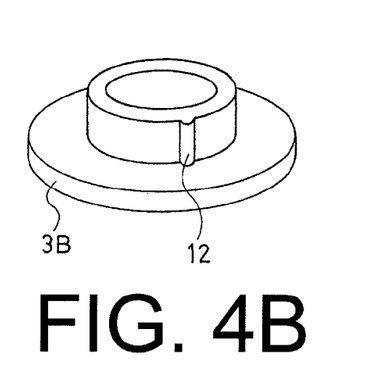

Additionally, FIGS. 3A and 3B, and FIGS. 4A and 4B illustrate other examples of the rotation preventing mechanism. FIGS. 3A and 3B illustrate an example in which a horizontal groove 9 and a horizontal protrusion 10 are provided on a pair of fasteners. FIGS. 4A and 4B illustrate an example in which a vertical groove 11 and a vertical protrusion 12 are provided on a pair of fasteners.

A minimum of only one of the mechanical fasteners 3 may be disposed in the pneumatic tire, but a plurality thereof may also be disposed. Disposing a plurality of the mechanical fasteners 3 is preferable because the degree of freedom of selection of a placement position of the object increases, and is also preferable because cases in which a plurality of objects are provided can be accommodated.

Preferable examples of a material that the mechanical fasteners 3 are made from include synthetic resins, metals, rubbers, and the like. The mechanical fasteners 3 may be provided with the same structure that fasteners also referred to as "hooks" or "snaps" in the clothing industry have, and preferably have a shape illustrated in FIGS. 2A to 2C, 3A and 3B, and 4A and 4B.

Methods for fixing the mechanical fastener 3A provided on the tire inner surface include fixing by vulcanization bonding when vulcanizing the tire or, alternatively, fixing by bonding using an adhesive or the like after vulcanization.

Therefore, the material is preferably a synthetic resin having a melting point of not less than 180° C., particularly because such a material can endure (not deform under) temperatures during tire vulcanization, and also because heat resistance with respect to high temperature conditions when used in a tire is excellent. Particularly preferable is a resin having a melting point of not less than 200° C. Moreover, when the material is constituted by a metal, the metal is preferably aluminum, steel, stainless steel, or brass.

Of the pair of mechanical fasteners 3, either the concave portion or the convex portion or, rather, the female portion or the male portion of the pair may be disposed on the tire side or, alternately, on the object side. Alternately, when providing a plurality of fasteners, a combination of both sides of the pair (concave portion and convex portion or, alternatively, female portion and male portion) may be disposed so as to be present.

Figure 5A:
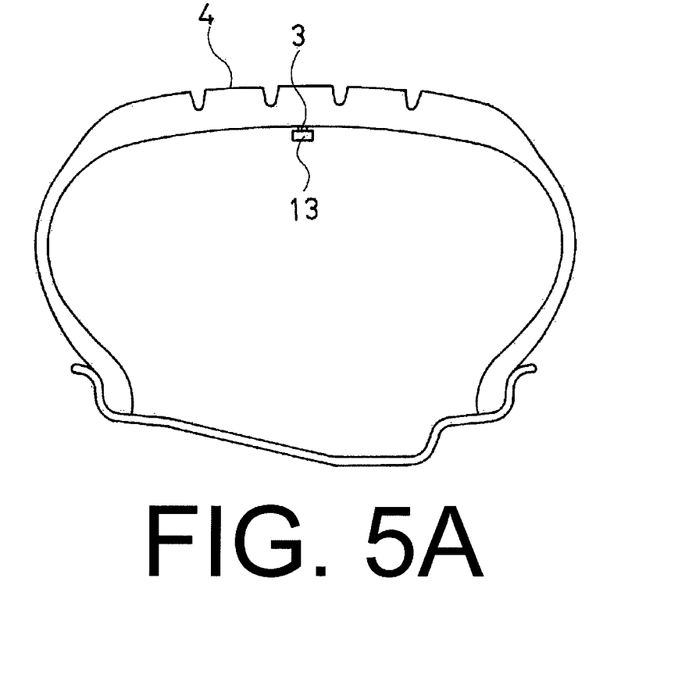
FIGS. 5A and 5B are cross-sectional views taken along a tire meridian line illustrating an embodiment of the pneumatic tire of the present technology, and are also partial cross-sectional perspective views.
Figure 5B:
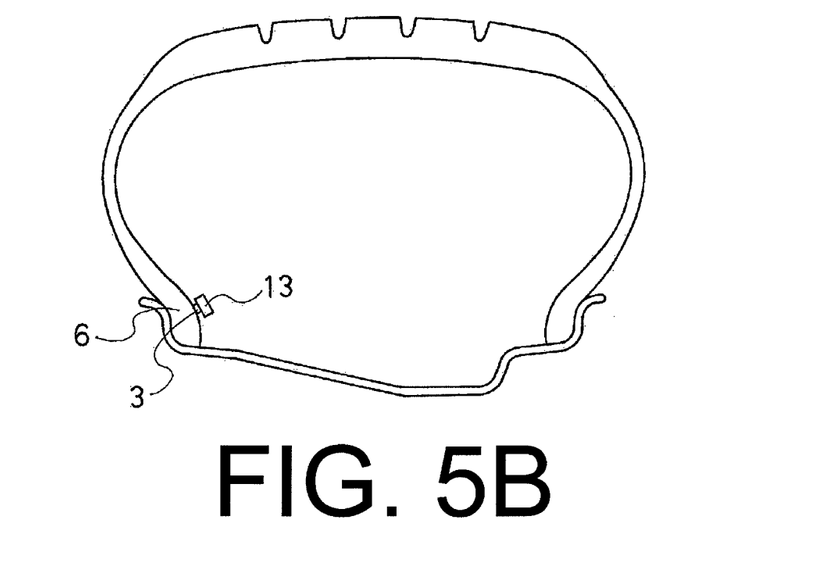

A position at which the mechanical fasteners 3 are disposed in a tire cavity is dependent on the function of the disposed object, but is preferably in the vicinity of a tread portion 4 as illustrated in FIG. 5A or, alternatively, in the vicinity of a bead portion 6 as illustrated in FIG. 5B. The objects may be provided at a plurality of positions selected from the vicinity of the tread portion 4, the vicinity of the bead portion 6, and the vicinity of the side wall portion 5 so that a plurality of objects 13 can be disposed based on the respective function thereof.

Figure 6A:
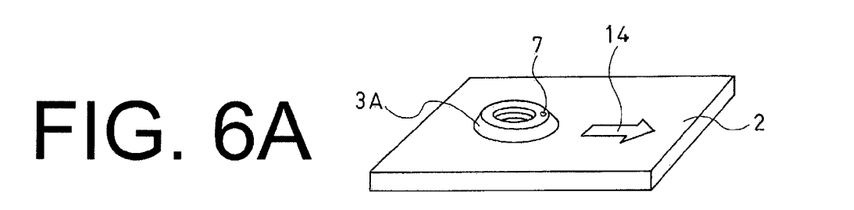
FIGS. 6A and 6B are main constituent perspective views illustrating an embodiment of the pneumatic tire of the present technology, and are drawings illustrating an example where an indicator of the attachment orientation of the object to be attached via a fastener is disposed at a position in the vicinity of the tire inner surface where the mechanical fasteners are provided; and a state in which the object to be attached has an indicator showing the attachment orientation.
Figure 6B:
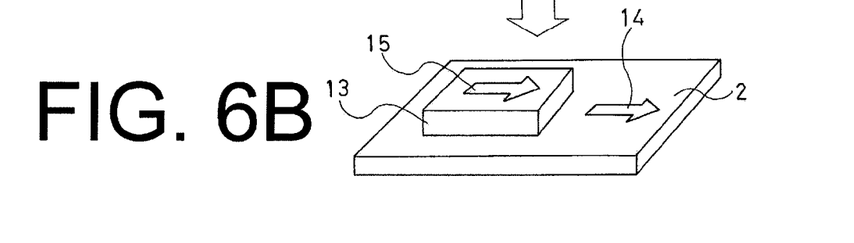
Figure 7:
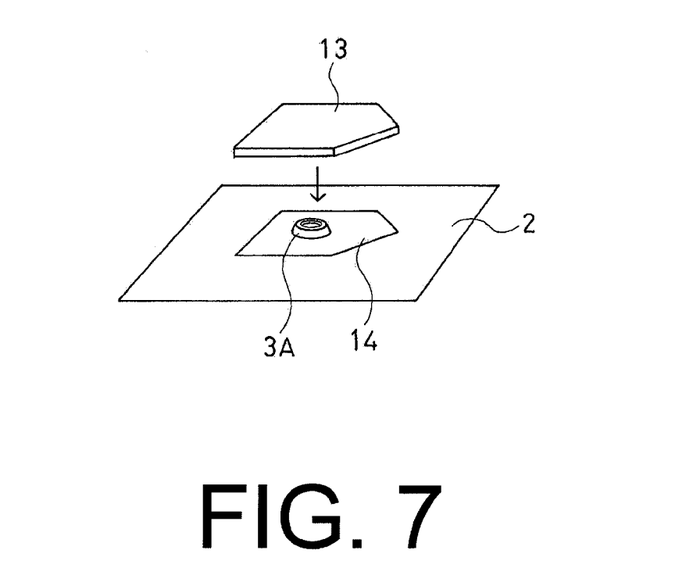
FIG. 7 is a main constituent perspective view illustrating an embodiment of the pneumatic tire of the present technology, and is a drawing illustrating a state in which the object attached via the mechanical fasteners is provided with a shape that indicates the attachment orientation.

FIG. 6A illustrates an example in which an arrow 14, indicating the attachment orientation of the object 13 (FIG. 6B) to be attached, is provided in the vicinity of the position where the mechanical fastener 3A is disposed on the tire inner surface. FIG. 6B further illustrates a state in which the object 13, having the fastener 3B (not illustrated), is disposed by engaging with the fastener 3A. According to the present technology, an arrow 15 is also provided on the object 13, and the fasteners 3A and 3b can be engaged and, at the same time, the concave portion 7 and the convex portion 8 (not illustrated) can be mated by orienting the arrow 15 so as to match the arrow 14 on the tire inner surface. Thereby, an optimal usage state of the object 13 can be maintained, and the object 13 can be disposed on the tire inner surface configured so as not to rotate when the tire is in use. Alternately, as illustrated in FIG. 7, the object 13 having the fastener 3B itself may be configured so as to have a shape/form (an example of an arrow is illustrated in the drawing) indicating the attachment orientation, and the attachment orientation may be indicated by providing the arrow 14 on the tire inner surface side.

According to the present technology, the object 13 having the second fastener (3B) of the pair of mechanical fasteners 3 can be accurately disposed on an inner surface of a pneumatic tire by engaging with the first fastener (3A), which pairs with the second fastener and is provided on the tire inner surface side.

This object 13 has various functions in line with the increasingly high-tech development of recent pneumatic tires. Examples of such functions include: (a) an electronic circuit including a sensor, (b) a balance weight, (c) a run-flat core, (d) an object on which an oxygen scavenger, a drying agent, and/or an ultraviolet light detecting color fixing agent is applied or mounted, (e) a noise absorbing member, (f) a surface fastener member, (g) a puncture sealant, and the like, of which a single function or a combination of multiple functions is exemplary.

Particularly, the object 13 is preferably an electronic circuit or a sensor because the technical significance of providing such an object on the tire inner surface is great. This is because the greatest effects are displayed when the present technology is applied to an electronic device and, specifically, optimal usage can be achieved when the object is a PFID, an air pressure sensor, an acceleration sensor, an angular velocity sensor, or the like. Of these, acceleration sensors or angular velocity sensors result in great effects and are more optimal for the present technology. This is because such sensors can function reliably due to being fixed and maintained having a set attachment orientation.

With the present technology, remarkable effects are displayed when an object using an electronic circuit requiring a fixed attachment orientation is disposed on the tire inner surface.

Particularly, there has been a strong demand in recent years to reduce tire-generated noise. Therefore, a noise absorbing member formed from an elastic porous material such as a sponge, a synthetic resin foam, or the like is an example of a preferable object for use in the present technology. Additionally, there is a demand for surface fastener members as well and, moreover, surface fastener members can function as an interposed body for advantageously attaching other objects. Therefore, such a surface fastener member is useful as the object for use in the present technology.

FIGS. 8A to 8D illustrate various examples of preferable forms of the appearance of the object 13 to be attached to the pneumatic tire of the present technology via the mechanical fasteners.

Figure 8A:
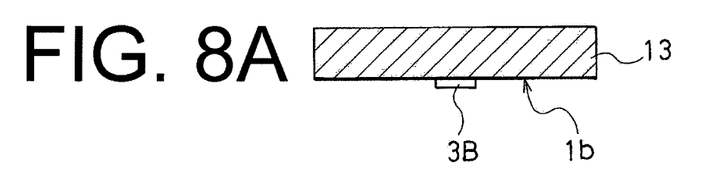
FIGS. 8A to 8D are schematic cross-sectional views illustrating a form of an appearance of the object attached via the mechanical fastener to the pneumatic tire of the present technology.
Figure 8B:
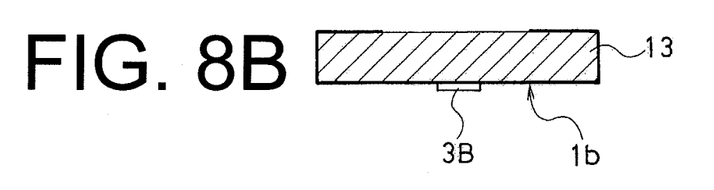
Figure 8C:
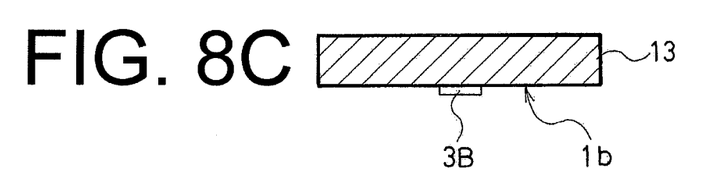

An entirety of the object 13 can be formed by adhering or covering the object 13 with a sheet material 16 (e.g. fabric, film, rubber sheet, etc.) on which the second fastener 3B of the pair of mechanical fasteners has been pre-disposed (FIGS. 8A to 8C). FIG. 8A illustrates an example wherein only a tire side surface of the object 13 is covered with the sheet material 16; FIG. 8B illustrates an example wherein an entirety of the object 13, except a portion of a surface on a side opposite the tire, is covered with the sheet material 16; and FIG. 8C is an example wherein an entirety of the object 13 is covered with the sheet material 16.

Figure 8D:
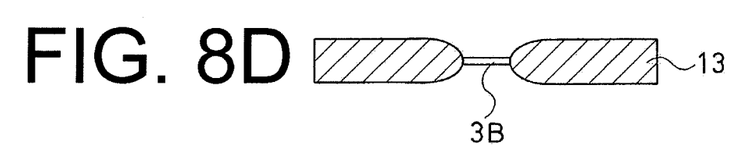

When, for example, an entirety of the object 13 is soft, like a sponge, the fastener 3B may be disposed so as to sandwich a top surface and a bottom surface of the object. Such a form is illustrated in FIG. 8D and the sheet material 16 may be omitted or used as desired. The sheet material 16 is preferably a fabric, a film, a rubber sheet, or the like having suitable flexibility.

1: Pneumatic tire
2: Tire inner circumferential surface
3: Mechanical fasteners
3A: Mechanical fastener (concave or female fastener)
3B: Mechanical fastener (convex or male fastener)
4: Tread portion
5: Side wall portion
6: Bead portion
7: Concave portion
8: Convex portion
9: Horizontal groove
10: Horizontal protrusion
11: Vertical groove
12: Vertical protrusion
13: Object
14: Indicator of the attachment orientation of the object (indicator on tire inner surface side)
15: Indicator of the attachment orientation of the object (indicator on object side)
16: Sheet material
21: Engaging cylinder

The invention claimed is:

1. A pneumatic tire comprising a separatable pair of mechanical fasteners comprising snaps, wherein
a first fastener of the pair of mechanical fasteners is provided on a tire inner surface, and the mechanical fasteners are provided with a rotation preventing mechanism for preventing the fasteners from mutually rotating when the pair of mechanical fasteners are engaged, one mechanical fastener of the pair of mechanical fasteners is a convex or male fastener having an engaging cylinder, and engages with another mechanical fastener of the pair of mechanical fasteners, and
the rotation preventing mechanism is provided on the engaging cylinder.

2. The pneumatic tire according to claim 1, wherein the rotation preventing mechanism comprises a convex portion provided on the first fastener and a concave portion, which corresponds to the convex portion, provided on a second fastener of the separatable pair of mechanical fasteners.

3. The pneumatic tire according to claim 1, wherein an indicator of an attachment orientation of an object to be attached via the fastener is provided in the vicinity where the mechanical fasteners are disposed.

4. The pneumatic tire according to claim 1, wherein an object provided with the second fastener that engages with the first fastener on the tire inner surface is fixed on the tire inner surface by engaging the first fastener with the second fastener.

5. The pneumatic tire according to claim 4, wherein the object provided with the second fastener has an indicator or shape indicating the attachment orientation.

6. The pneumatic tire according to claim 4, wherein the object provided with the second fastener is an electronic circuit or a sensor.

7. The pneumatic tire according to claim 6, wherein the sensor is an acceleration sensor or an angular velocity sensor.

8. The pneumatic tire according to claim 1, wherein the pair of mechanical fasteners are formed from a synthetic resin having a melting point of not less than 180° C.

9. The pneumatic tire according to claim 1, wherein the pair of mechanical fasteners are formed from a metal material selected from one or more of aluminum, steel, stainless steel, and brass.

10. The pneumatic tire according to claim 1, wherein the pair of mechanical fasteners are formed from a rubber material.

11. The pneumatic tire according to claim 1, wherein the pair of mechanical fasteners comprise a pair of shapes selected from the group consisting of
(1) a pair of shapes in which one mechanical fastener of the pair of mechanical fasteners comprises a concave portion and the other mechanical fastener of the pair of mechanical fasteners comprises a convex portion,
(2) a pair of shapes in which one mechanical fastener of the pair of mechanical fasteners comprises a horizontal groove and the other mechanical fastener of the pair of mechanical fasteners comprises a horizontal protrusion, and
(3) a pair of shapes in which one mechanical fastener of the pair of mechanical fasteners comprises a vertical groove and the other mechanical fastener of the pair of mechanical fasteners comprises a vertical protrusion.

12. The pneumatic tire according to claim 1, wherein the first fastener is affixed to the tire inner surface by vulcanization bonding when vulcanizing the tire.

13. The pneumatic tire according to claim 1, wherein the first fastener is affixed to the tire inner surface by bonding using an adhesive after vulcanizing the pneumatic tire.

14. The pneumatic tire according to claim 1, wherein a position at which the mechanical fasteners are disposed in a tire cavity is in the vicinity of a tread portion of the pneumatic tire.

15. The pneumatic tire according to claim 1, wherein a position at which the mechanical fasteners are disposed in a tire cavity is in the vicinity of a bead portion of the pneumatic tire.

16. The pneumatic tire according to claim 1, wherein an elastic porous noise absorbing member provided with the second fastener that engages with the first fastener on the tire inner surface is fixed on the tire inner surface by engaging the first fastener with the second fastener.

17. The pneumatic tire according to claim 16, wherein one fastener of the pair of mechanical fasteners is sandwiched between end portions of the elastic porous noise absorbing members.

18. The pneumatic tire according to claim 1, wherein in a plan view of the inner surface of the tire, one mechanical fastener of the pair of mechanical fasteners has a round shape.

19. A pneumatic tire comprising a separatable pair of mechanical fasteners comprising snaps, wherein
- a first fastener of the pair of mechanical fasteners is provided on a tire inner surface,
- the mechanical fasteners are provided with a rotation preventing mechanism for preventing the fasteners from mutually rotating when the pair of mechanical fasteners are engaged,
- an elastic porous noise absorbing member provided with the second fastener that engages with the first fastener on the tire inner surface is fixed on the tire inner surface by engaging the first fastener with the second fastener, and
- one fastener of the pair of mechanical fasteners is sandwiched between end portions of the elastic porous noise absorbing members.

\* \* \* \* \*